United States Patent [19]
Phillips, Jr.

[11] 3,896,028
[45] July 22, 1975

[54] PARTICULATE METAL FILTER MEDIUM FOR POLYMER MELTS
[75] Inventor: William Lewis Phillips, Jr., Wilmington, Del.
[73] Assignee: E. I. du Pont de Nemours & Company, Wilmington, Del.
[22] Filed: Nov. 29, 1973
[21] Appl. No.: 420,323

[52] U.S. Cl. ............... 210/152; 75/.5 R; 75/126 R; 210/263; 210/282; 210/503
[51] Int. Cl. ............................................ B01d 23/10
[58] Field of Search ..... 29/163.5 F; 75/126 R, .5 R; 210/263, 266, 290, 496, 500, 503, 504, 510, 152, 282; 425/197–199

[56] References Cited
UNITED STATES PATENTS

| | | | |
|---|---|---|---|
| 2,071,740 | 2/1937 | Franks | 75/126 R |
| 2,362,277 | 11/1944 | Jones | 75/126 R |
| 2,554,343 | 5/1951 | Pall | 210/503 X |
| 2,819,161 | 1/1958 | Cupler | 75/126 R |
| 3,172,758 | 3/1965 | Jandras | 75/126 R |
| 3,269,833 | 8/1966 | Scruggs | 75/126 R |
| 3,723,101 | 3/1973 | Hunt | 75/126 R |
| 3,842,006 | 10/1974 | Burt | 210/263 X |

OTHER PUBLICATIONS

Product Licensing Index, p. 30 (December 1968).

*Primary Examiner*—Frank A. Spear, Jr.
*Assistant Examiner*—Robert G. Mukai

[57] ABSTRACT

A particulate metal filter medium for polymer melts is characterized by a shape factor of less than 0.58, is exceptionally porous and has a high resistance to compaction at melt filtration pressures and is substantially inert to polymer melts. The particulate filtering medium is formed from an alloy containing 30 to 40% by weight chromium, about 3% by weight silicon, minor amounts of carbon and nitrogen and the remainder iron.

4 Claims, 5 Drawing Figures

1

PARTICULATE METAL FILTER MEDIUM FOR POLYMER MELTS

BACKGROUND OF THE INVENTION

This invention relates to particulate filter media useful for the shear-filtration of melts of thermoplastic polymers. More particularly, it relates to a metal alloy from which the filtering medium is formed.

Shear-filtration of hot melts of thermoplastic polymers has long been practiced. Extensive prior art documents the continuing search for an ideal shearfiltration medium. Among the materials disclosed in the prior art are silica sand, metal filings, glass beads, sintered porous metal plates and shaped structures, metal screens, layers of tightly woven fiber glass cloth, and nonwoven fiber glass matts. It is also known that improvements in shear-filtration can result from the use of irregularly shaped metal particles.

In addition to being inexpensive, the ideal filtering medium must have and must maintain high porosity at the pressures encountered during polymer-melt filtration. In order to maintain high porosity, beds of the particles should be highly resistant to compaction. Characteristic of most hot polymers is a tendency to form gel which accumulates in and reduces the filtration efficiency of filter media. Thus, the particulate-metal filtering material must not catalyze or otherwise contribute to gel formation.

Iron and its oxides are well known as promoters of degradation leading to gel-formation in hot polymers. To overcome this problem, particulate stainless steel (e.g., Types 304 or 316) has been used, particularly in sintered shaped structures. However, even stainless steels are insufficiently inert and as a result the prior art proposes to use chromium and/or alloys containing at least 60% by weight chromium, less than 5% iron, and at least one other metal selected from nickel, molybdenum; and manganese. These alloys are indeed very inert to hot polymers, but as particulate filtering media they have low ductility, break up under compression to form fines, and have a resultant low porosity at extrusion pressures required for polymer melts. In addition, no commercial process is known for forming high-chromium alloys into particles providing the desired high porosity. Thus, while prior art materials are known which provide high levels of some of the requisite properties of an ideal filter medium, none has yet been proposed which simultaneously provides desired high levels of all the requisite properties.

SUMMARY OF THE INVENTION

This invention provides a particulate-metal filter medium which, in the filtration of polymer melts, has a pack-life about twice that of commonly used silica sand. It further provides a filter medium which is exceptionally porous, highly resistant to compaction at melt-filtration pressures, substantially inert to polymer melts (e.g., nylons and polyesters), and relatively inexpensive. Further provisions of this invention will be found in the remainder of this specification.

The particulate filtering medium of this invention is formed from an alloy containing 30 to 40% (preferably 35 ± 1%) by weight chromium, 3 ± 1% by weight silicon, minor amounts, at ordinary levels, of carbon and nitrogen (i.e., 100–400 parts per million by weight carbon, and 600–1,000 parts per million by weight nitrogen), the remainder being essentially iron. The particles are irregularly shaped and rough-surfaced to provide a shape factor less than about 0.58.

A bed of the particles is characterized by a porosity of at least 60% under no applied load and by compaction of no more than about 20% under an applied load of about 5000 psi. (352 kg./cm.$^2$).

DETAILED DESCRIPTION OF THE PREFERRED EMBODIMENT

Figure 1:
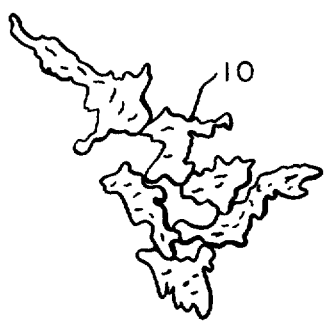
FIG. 1 is a greatly magnified view of particles of the instant invention, showing their irregular shape and rough surfaces.

FIG. 1 is a greatly magnified view of particles 10 of the present invention showing their irregular, rough, and somewhat fibrous appearance. These particles are preferably prepared by impinging jets of water or steam onto an extruded stream of molten metal alloy, thereby explosively disintegrating the alloy into particles generally as illustrated in FIG. 1. Alternatively, these irregular particles may be prepared by the "Coldstream Process" as described in *Precision Metal*, Vol. 27(4), p. 52 (1969), in which a high pressure air stream shoots the molten alloy through a venturi nozzle at a target in an evacuated chamber. Temperature of the alloy drops instantaneously on exit from the nozzle whereby the chilled alloy shatters on impact with the target.

Figure 2:
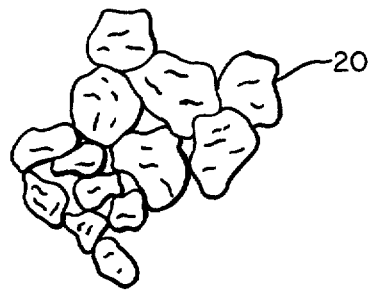
FIG. 2 shows similarly magnified particles of silica sand as commonly employed for melt filtration.

FIG. 2 generally depicts, at similar magnification, particles 20 of commonly used filtering media, more specifically silica sand. Such particles approximate spheres in shape, although uneven bumpy surfaces often are present. These known shapes provide, for a given volume and average particle size, much less free space (porosity) than do the particles of this invention. Even particles formed according to FIG. 1 of known metal alloys accelerate the degradation and gelation of the polymer melt to too great a degree and/or are insufficiently resistant to compaction at pressures required for filtration of polymer melts.

Figure 3:
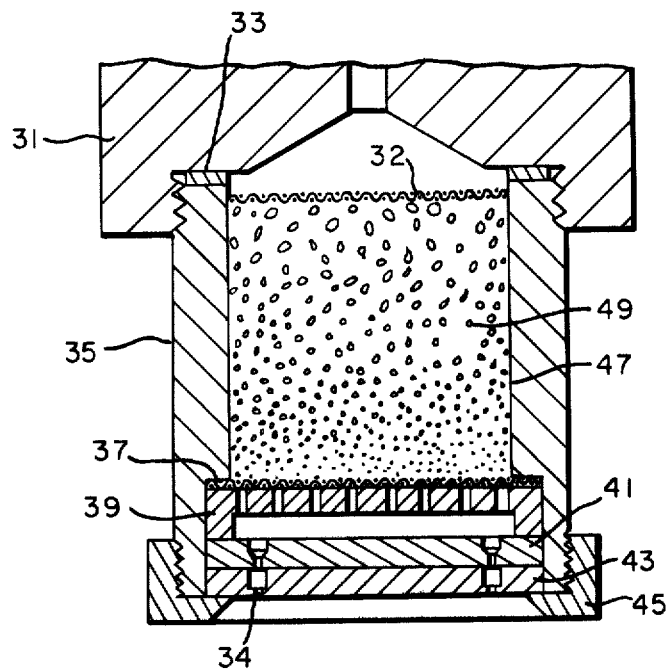
FIG. 3 depicts in cross-section a typical spinning pack utilizing a particulate filtering medium.

FIG. 3 shows a typical spinning pack assembly using particulate shear-filtration media. The spinning pack assembly includes a filter body 35 threaded into spinning block 31 against gasket 33. A screen 37, a distribution plate 39, a metering plate 41, and a spinneret 43 are retained in one end of body 35 by support ring 45 threaded onto the body. The cavity 47 of body 35 is at least partly filled with a particulate shear-filtration medium 49 and then, preferably, capped with a coarse screen 32. Flow is from spinning block 31, through the shear-filtration medium 49, and ultimately through outlet capillaries 34 of spinneret 43. Ordinarily cavity 47 is filled with 2 or more layers of particles 49 of graded mesh sizes, the layer with the finest particles resting against screen 37 and the layer with the coarsest particles being adjacent to screen 32.

The chemical composition of the alloy of which the particles of this invention are composed must be very carefully controlled in order to realize the unexpectedly improved properties. It should contain 30–40% by weight chromium and 3 ± 1% silicon, minor amounts of carbon and nitrogen, with the remainder being substantially of iron. The silicon is required to impart sufficient fluidity to the molten alloy that it will disintegrate on contact with jets of water or steam into a high yield of particles of mesh sizes commonly used for melt filtration (e.g., between about 25 and 200 mesh). Above 40% chromium, brittleness increases rapidly. Below 30% chromiun, the particles become less inert to polymer melts, and resistance to compaction diminishes. Optimum results occur when the chromium content is 35 ± 1% by weight.

While applicant does not wish to be limited by any particular explanation for the inertness of the particles of this invention, it is believed that, when the alloy is disintegrated, the chromium diffuses to the surface of each particle to form a "skin" of chromium oxide. Unless there is sufficient chromium, the skin will be unable to completely insulate the polymer melt from the known degradative effects of iron beneath the skin. About 35% by weight chromium is apparently a critical minimum for assuring complete insulation of the polymer melt from any contact with iron or its oxides. Inertness is herein characterized by "time to gel" as described hereafter.

The minor amounts of carbon and nitrogen mentioned above must be in the range of 100–400 parts per million by weight carbon and 600–1000 parts per million by weight nitrogen, for a combined total of 700 to 1400 parts per million. It is believed that these minor ingredients form chromium carbide and chromium nitride phases which contribute to the high resistance to compaction. The carbon and nitrogen levels required in this invention are at ordinary levels which result when the alloy is made without special control of their levels. If such is not the case, the levels must be adjusted using techniques well known in the iron alloying art. In the examples the alloy of this invention will be referred to as Fe/35% Cr/3% Si but will be understood to include in each instance 310 parts per million by weight carbon and 740 parts per million by weight nitrogen unless otherwise specified.

Porosity and Compaction Resistance

Porosity, as used herein, is the percentage of free space among the particles in a layer of the same. Unless identified otherwise, it is measured when the layer is under no load, i.e., is uncompacted, and is designated $E_o$. Porosity $E_o$ is readily determined by placing particles in a graduated cylinder to a known apparent volume $V_a$, and by adding a known volume $V_1$ of water to a total indicated volume $V$ at least equal to, and preferably exceeding, $V_a$ so that all voids in and among particles are filled with water. Then, $$E_{o/100} = 1 - (V - V_1)/V_a$$

Given $E_o$, porosity $E$ under a given load for a bed of dry particles may be calculated by first measuring percent compaction C. Thus, if a given height $H_o$ of the bed at no load is reduced to height H at a given load while maintaining constant cross-sectional area, $$C = 100 \ (H_o - H)/H_o \text{ and}$$

$$E = 100 \ (E_o - C)/(100 - C)$$

The particulate filtering materials of the present invention are characterized by $E_o$ greater than about 60%, C at 5000 psi (352 kg./cm.²) not exceeding about 20%, and C at 10,000 psi (703 kg./cm.²) not exceeding about 30%. While commonly used silica sand has compactions of only about 5% and 10% at the respective pressures, its initial porosity is in the range of 37 to 40% resulting in much lower porosities at all pressures in use.

Porosity and compaction measurements on a wide variety of pure metals and metal alloys possibly inert to polymer melts reveal that, aside from the material of this invention, Type 316 stainless steel is the most porous and compaction-resistant. Similarly prepared particles of Type 316 stainless steel and of the Fe/35% Cr/3% Si alloy of this invention are sieved to provide two particle size fractions of each, i.e., 50/80 and 140/170 fractions. The 50/80 designation means that substantially all particles pass through 50-mesh screens but that substantially none pass through 80-mesh screens (mesh is as defined for the Standard U.S. Sieve series). All other paired mesh sizes herein have this same significance. For both particles the porosity ($E_o$) is 72% for 50/80 mesh and 62% for 140/170. Percent compactions for the two are:

|  | 5000 psi (352 kg./cm.²) | | 10,000 psi (703 kg./cm.²) | |
| --- | --- | --- | --- | --- |
|  | 140/170 | 50/80 | 140/170 | 50/80 |
| Type 316 | 20 | 35 | 29 | 44 |
| Fe/35% Cr/3% Si | 15 | 20 | 25 | 29 |

As is well known, fractions of larger particle size compact more. The particles of this invention are at least as porous and compaction-resistant as any known particulate-metal filter media.

The above carefully sieved fractions are resieved subsequent to compaction under 10,000 psi (703 kg./cm.²) pressure. No fines are detected on resieving, indicating that both of these particles resist fracture during use.

A still further advantage of the particles of this invention is shown by the apparent lack of interaction at the interface of layers of graded sizes. In other words, the compaction for graded layers of the particles is very close to the average compaction of the individual layers or fractions.

"Time to Gel" Measurement

Figure 4:
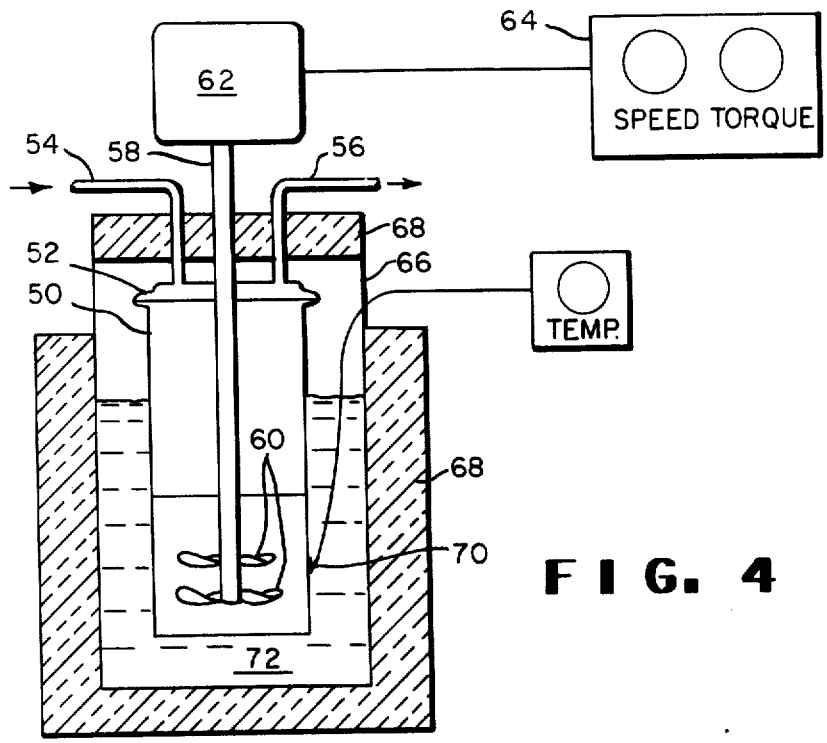
FIG. 4 schematically represents apparatus for measuring "time to gel" for polymer melts.

"Time to Gel" (t) is a measure of the inertness of a given particulate metal to a given polymer melt. It is obtained using an all-glass apparatus as schematically shown in FIG. 4 of the drawings. Various metal powders are sieved to provide samples of substantially equivalent surface area (i.e., from 0.1 to 0.3 m²/gm.). Polymer flake to be used is dried overnight at 150°C. under vacuum. Into container 50 are placed 300 gm. of dry polymer flake and 50 gm. of dry metal particles. Container 50 is immediately closed by cover 52, and flushed thereafter continuously with dry nitrogen entering via duct 54 and exiting via duct 56 through cover 52. Rotatable shaft 58 also extends through cover 52 down to 2 stirrer blades 60 below the surface of the added materials. Shaft 58 is driven by motor 62 provided with transducers (not shown) whereby motor speed is read and regulated and torque generated is indicated on a remotely connected electronic torquemeter 64. A second larger container 66 surrounds container 50 and holds molten Woods metal 72 as a heating medium. Suitable heat-insulation material 68 surrounds top, sides, and bottom of container 66. One or more thermocouples 70 at the submerged wall of container 50 are used conventionally to measure temperature of the polymer melt and to regulate temperature of Woods metal 72 via a heating device (not shown).

As soon as the apparatus is charged and assembled, temperature of the contents is raised to and maintained at 300°C. to melt the polymer. Thereafter, shaft 58 is turned at a constant speed of 40 rpm to keep the metal particles dispersed throughout the molten polymer. The torque generated by motor 62 is recorded as a function of time. In the system used, torque is indicated by a proportional electrical signal in millivolts (mV). The absolute value of indicated torque is immaterial as long as its relative change with $t$ (in hours) is obtainable.

Figure 5:
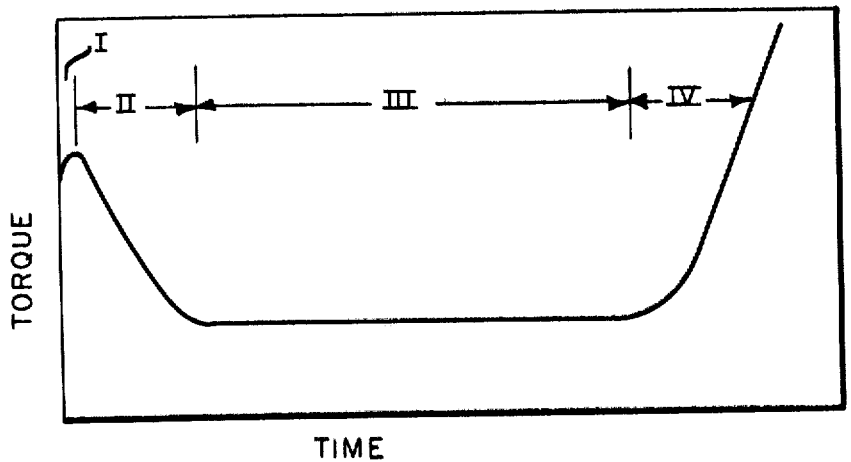
FIG. 5 is a graphical representation of the variation of torque with time for a typical polymer melt.

FIG. 5 is a typical plot of torque (mV) vs. time (hr.) for a given test. Interval I is a brief period of initial increase in relative viscosity (molecular weight) of the polymer. Then, in Interval II, torque decreases sharply to remain substantially constant during Interval III. Finally, Interval IV, degradation and consequent gelation proceed to a level where torque sharply increases. The elapsed time to the onset of Interval IV is taken as the "time to gel".

"Time to gel" for polyethylene terephthalate is strongly dependent on the catalyst system used for original polymerization. For homopolymer with a relative viscosity (RV) of 20 tested as a control without added metal particles, time to gel is 415 hr. for a (Ge. Mn) catalyst system, 338 hr. for (Sb, Mn), and 295 hr. for (Sb, Zn). Thus, in comparing the inertness of various metal particles, only a single supply of polymer should be used. Using the above (Sb, Mn) catalyzed polyethylene terephthalate polymer, the following times to gel are obtained.

| Metal Powder | t (hr.) |
|---|---|
| none | 338 |
| chromium | 250 |
| Fe/35% Cr/3% Si | 238 |
| aluminum | 210 |
| Type 316 stainless steel | 140 |
| Type 304 stainless steel | 130 |
| copper | 130 |
| iron | 125 |
| nickel | 90 |

While chromium, aluminum, and the Fe/35% Cr/3% Si particles of this invention are clearly superior as to inertness, aluminum is known for its ductility (i.e., low resistance to compaction), and chromium and high chromium alloys for their brittleness (i.e., tendency to produce low porosity fines).

Times to gel for nylon are much shorter than for polyethylene terephthalate. A series similar to the above is carried out using a commercial polyhexamethylene adipamide flake as the polymer. Measured times to gel are:

| Metal Powder | t (hr.) |
|---|---|
| none | 32 |
| chromium | 31 |
| Fe/35% Cr/3% Si | 31 |
| aluminum | 31 |
| nickel | 30 |
| Type 316 stainless steel | 24 |
| Type 304 stainless steel | 22 |

-Continued

| Metal Powder | t (hr.) |
|---|---|
| iron | 16 |
| copper | 14 |

Again it is shown, however, that the Fe/35% Cr/3% Si particles of this invention are relatively very inert toward polymer melts.

Particle Shape Factor

Numerical characterization of the irregular shapes (FIG. 1) of the particles of this invention can be obtained using the Carman-Kozeny equation. This equation relates the characteristics of any filter bed to a bed of spherical particles by the Shape Factor $\phi$.

$$\phi = \frac{6(1-E)}{DE} \sqrt{\frac{5 MUL}{E \Delta P}}$$

where
E = bed porosity
D = mean spherical diameter
5 = an empirical constant
M = viscosity of fluid passing through the bed
U = superficial velocity, i.e., velocity of fluid through the empty filter-medium container
L = bed depth
$\Delta P$ = pressure drop through the bed.

A discussion of this characterization of filter beds is in Perry's Chemical Engineers Handbook, Third Edition, pp. 393-395.

The Shape Factor of particulate materials is measured as follows. Using a cylindrical container of 13 mm. inside diameter, a bed of particles is placed upon four 50 × 50 mesh screens to a depth of 13 mm. A model fluid, corn syrup of approximately 10 poise viscosity at room temperature, is forced down through the bed at a known flow rate. Spherical particles have a Shape Factor of 1.0. Silica sand in mesh sizes commonly used has a $\phi$ of about 0.77. For the range of particle sizes investigated for the particles of this invention, the shape irregularity is characterized by $\phi$ in the range 0.26 to 0.58.

All the discussion hereinbefore has been directed to the use of filtering beds of loose particles. The particles of this invention are also useful as unitary filtering bodies resulting when the particles are sintered into shaped structures. The shaped structures may be discs with plane or contoured surfaces or more complicated structures. The sintering is preferably accomplished while the particles are either not at all or only very slightly compacted.

In addition to the elevated temperatures required (1300° to 1540°C.), the formation of interparticle fusion bonds requires that sintering be carried out in a reducing atmosphere, e.g., hydrogen. It is believed that the thin chromium oxide "skins" are thereby reduced to chromium allowing interparticle ferritic bonds to develop at points of contact. Subsequent exposure to air redevelops the chromium oxide "skins".

EXAMPLE I

Using a pack assembly substantially as shown in FIG. 3, yarns of polyethylene terephthalate are extruded in two tests identical except for the filtering media employed. Each yarn has 44 filaments and a total denier, after cold-drawing, or 70. The feed polymer has a relative viscosity of 20.5. [Relative viscosity is determined as the solution/solvent ratio of absolute viscosities at 25°C. The solvent is hexafluoroisopropanol. The solution results from dissolving 0.8 gm. of polymer in 10 ml. of solvent.] Temperature of molten polymer on entrance to the filter medium is 285°C., the cross-sectional area of the filter cavity is 3.8 square inches (24.5 cm.$^2$), and flow rate of molten polymer through the filter medium is constant at 3.02 lb./hr. (1.37 kg./hr.).

The first test employs Fe/35% Cr/3% Si particles as the filtering medium. The filter cavity is filled, in order, with a coarse supporting screen, a 0.125 inch (0.32 cm.) thick sintered stainless steel disc of porosity equivalent to 20 mesh, 10 ml. of 100/140 mesh Fe/35% Cr/3% Si particles, 20 ml. of 50/70 mesh Fe/35% Cr/3% Si particles, 30 ml. of 25/50 mesh Fe/35% Cr/3% Si particles, and enough (about 20 ml.) of coarse No. 10 aluminum oxide particles to fill the remaining space. The Fe/35% Cr/3% Si particles are characterized as follows:

| Mesh | Time to Gel (hr.) | Shape Factor | Eo | C (5000 psi) |
|---|---|---|---|---|
| 100/140 | 236 | .29 | 70 | 17 |
| 50/70 | 238 | .49 | 72 | 20 |
| 25/50 | 240 | .53 | 74 | 22 |

The second test employs sand as the filtering medium. The filter cavity is filled in order with a six-layer coarse supporting screen, 20 ml. of 60–80 mesh sand, 45 ml. of 25/50 mesh sand, and a single-layer coarse covering screen.

The two tests perform as follows:

| | Fe/35% Cr/3% Si | Sand |
|---|---|---|
| Spinning breaks/1000 lb. | 1.3 | 2.1 |
| Pack Life (days) | 12 | 1.3 |

In the case of the Fe/35% Cr/3% Si test, life of the pack is determined as the time at which pack pressure rises to a preset pressure (5000 psi.). In the case of the sand test, pack life is determined as the time when the level of broken filaments during subsequent drawing and winding exceeds acceptable levels. Careful analysis shows the breaks to result from gel particles in the filaments.

EXAMPLE II

Three comparison tests are carried out using polyhexamethylene adipamide polymer to produce 13 filament yarns which, when fully drawn, have a total denier of 40. One utilizes Fe/35% Cr/3% Si particles in the filter cavity; another uses sand and the third uses Type 316 stainless steel.

In the first test, the filter cavity is filled (in order) with:
1. a 0.0625 inch (0.159 cm.) thick disc of sintered 80/100 mesh Type 316 stainless steel which passes any particles less than 15 microns effective diameter.
2. 8 ml. of 140/200 mesh Fe/35% Cr/3% Si
3. 4 ml. of 100/140 mesh Fe/35% Cr/3% Si
4. 10 ml. of 70/100 mesh Fe/35% Cr/3% Si
5. 8 ml. of 50/70 mesh Fe/35% Cr/3% Si
6. a 50 mesh coarse screen.

The Fe/35% Cr/3% Si particles are characterized as follows:

| Mesh | Time to gel (hrs.) | Shape Factor | Eo | C (5000 psi) |
|---|---|---|---|---|
| 140/200 | 31 | .27 | 69 | 15 |
| 100/140 | 31 | .29 | 70 | 17 |
| 70/100 | 31 | .33 | 71 | 19 |
| 50/70 | 31 | .49 | 72 | 20 |

In the second test, the filter cavity is filled (in order) with:
1. a coarse supporting screen
2. 15 ml. of 150/200 mesh sand
3. 6 ml. of 80/100 mesh sand
4. 9 ml. of 25/50 mesh sand
5. a covering coarse screen.

In a third test, the filter cavity is filled (in order) with:
1. a 0.0625 inch (0.159 cm.) thick disc of sintered 80/100 mesh Type 316 stainless steel which passes any particles less than 15 microns effective diameter.
2. 8 ml. of 140/200 mesh Type 316 stainless steel.
3. 4 ml. of 100/140 mesh Type 316 stainless steel.
4. 10 ml. of 80/100 mesh Type 316 stainless steel.
5. 8 ml. of 50/80 mesh Type 316 stainless steel.
6. a 50 mesh coarse screen.

Further conditions and test results are:

| | Fe/35% Cr/3% Si | Type 316 stainless steel | Sand |
|---|---|---|---|
| Relative viscosity* | 40 | 40 | 42 |
| Polymer melt temp. (°C.) | 291 | 291 | 291 |
| Cross-sectional area of filter cavity - in.$^2$ (cm.$^2$) | 3.02 (19.5) | 3.02 (19.5) | 3.02 (19.5) |
| Spinning breaks/1000 lb. | 1.9 | 1.7 | 4.3 |
| Pack life (days) | 25 | 15 | 7 |

*As defined in Example 1 except the solvent is 90% formic acid and the solution contains 8.4% by weight polymer. Pack life is the extrusion time elapsed until the pack pressure equals a preset pressure for the pack.

EXAMPLE III

This example shows the effect of chromium concentration in preparation of the alloys on measured times to gel, on C at 5000 psi. (352 kg./cm.$^2$), and on resistance to brittle fracture. The particles of this example are prepared using 3 ± 1% silicon, carbon and nitrogen levels (not precisely determined) within specified ranges, and chromium contents (% by weight) as shown below, the remainder being iron.

Times to gel are determined using a single supply of polyethylene terephthalate with a relative viscosity of about 20, as hereinabove described. Results are:

| % Cr | time to gel (hrs.) |
|---|---|
| 0 | 125 |
| 18 | 185 |
| 26 | 227 |
| 35 | 238 |
| 40 | 240 |
| 50 | 240 |
| 100 | 250 |

A plot of the above results (time to gel vs. % Cr) shows that time to gel decreases sharply as % Cr is reduced below 30%.

The same supply of particulate materials is carefully sieved to provide two particle-size fractions. The 140/170 fraction is one in which all particles pass through a 140-mesh screen and none through a 170-mesh screen. The 50/80 fraction is equivalently prepared. Particles of 100% Cr having equivalent sizes and shape irregularities are not available and could not be included. Each fraction is tested for C at 5000 psi. (352 kg./cm.$^2$) and at 10,000 psi. (704 kg./cm.$^2$), after which the tested fractions are resieved. The percentage by weight of fines (i.e., particles passing through the finer screen) is a measure of brittleness for the particles. Results for the 140/170 fraction are:

| % Cr | at 5000 psi (352 kg./cm.$^2$) | | at 10,000 psi (704 kg./cm.$^2$) | |
|---|---|---|---|---|
| | C | % fines | C | % fines |
| 0 | 42 | 0 | 48 | 0 |
| 18 | 33 | 0 | 39 | 0 |
| 26 | 25 | 0 | 32 | 0 |
| 35 | 15 | 0 | 25 | 0 |
| 40 | 12 | 0 | 23 | 1 |
| 50 | 25 | 10 | 32 | 25 |

Results for the 50/80 fraction are:

| % Cr | at 5000 psi (352 kg./cm.$^2$) | | at 10,000 psi (704 kg./cm.$^2$) | |
|---|---|---|---|---|
| | C | % fines | C | % fines |
| 0 | 55 | 0 | 61 | 0 |
| 18 | 24 | 0 | 44 | 0 |
| 26 | 30 | 0 | 37 | 0 |
| 35 | 20 | 0 | 29 | 0 |
| 40 | 18 | 0 | 27 | 4 |
| 50 | 35 | 15 | 36 | 60 |

It is apparent from the above that brittleness increases abruptly as the percentage of chromium used exceeds about 40% by weight.

What is claimed is:

1. A particulate filter medium for polymer melts comprising: irregularly shaped, rough surfaced particles having a composite shape factor less than 0.58, said particles being formed from a metal alloy, said alloy consisting essentially of about 30 percent to about 40 percent by weight chromium; about 2 percent to about 4 percent by weight silicon; 100 to 400 parts per million by weight carbon and 600 to 1,000 parts per million by weight nitrogen; and the remainder iron.

2. The particulate filter medium of claim 1, said alloy consisting essentially of about 35 percent by weight chromium; about 3 percent by weight silicon; about 310 parts per million by weight carbon; about 740 parts per million by weight nitrogen; and the remainder iron.

3. In a spinning pack assembly including a filter body through which polymer flows from a pressurized source to a spinneret for forming filaments, the improvement comprising: said body containing a bed of irregularly shaped rough surfaced metal particles having a shape factor of less than about 0.58, said bed being characterized by a porosity of at least 60 percent under no applied load and by compaction of no more than about 20 percent or about 30 percent under applied loads of about 5,000 pounds per square inch or 10,000 pounds per square inch respectively, said metal particles being formed from an alloy, said alloy consisting essentially of about 30 percent to about 40 percent by weight chromium; about 2 percent to about 4 percent by weight silicon, 100 to 400 parts per million by weight carbon; 600 to 1,000 parts per million by weight nitrogen; and the remainder iron.

4. The assembly as defined in claim 3, said alloy consisting essentially of about 35 percent by weight chromium; about 3 percent by weight silicon; about 310 parts per million by weight carbon; about 740 parts per million by weight nitrogen; and the remainder iron.

* * * * *